United States Patent [19]
Chrysam et al.

[11] Patent Number: 6,022,577
[45] Date of Patent: *Feb. 8, 2000

[54] HIGH STEARIC ACID SOYBEAN OIL BLENDS

[75] Inventors: Michael M. Chrysam, Blairstown, N.J.; Turiddu A. Pelloso, Carmel, Ind.

[73] Assignee: Nabisco Technology Company, Chicago, Ill.

[ * ] Notice: This patent is subject to a terminal disclaimer.

[21] Appl. No.: 07/794,764

[22] Filed: Nov. 18, 1991

Related U.S. Application Data

[63] Continuation-in-part of application No. 07/624,056, Dec. 7, 1990, abandoned, and a continuation-in-part of application No. 07/665,629, Mar. 6, 1991, abandoned, said application No. 07/624,056, is a continuation-in-part of application No. 07/410,161, Sep. 20, 1989, abandoned.

[51] Int. Cl.$^7$ .............................. A23D 7/00; A23D 9/02
[52] U.S. Cl. ........................ 426/601; 426/606; 426/607; 554/1; 435/177; 435/134
[58] Field of Search ................................ 426/601, 606, 426/607, 602, 603; 435/177, 134; 554/1

[56] References Cited

U.S. PATENT DOCUMENTS

| | | |
|---|---|---|
| 3,617,308 | 11/1971 | Graffelman . |
| 3,859,447 | 1/1975 | Sreenivasan . |
| 4,275,081 | 6/1981 | Coleman .................. 426/601 |
| 4,366,181 | 12/1982 | Dijkahoorn . |
| 4,419,291 | 12/1983 | De Lathauwer . |
| 4,425,371 | 1/1984 | Stratmann . |
| 4,438,149 | 3/1984 | Verhagen . |
| 4,479,976 | 10/1984 | Lansbergen . |
| 4,504,503 | 3/1985 | Biernoth . |

FOREIGN PATENT DOCUMENTS

| | | |
|---|---|---|
| 369519 | 11/1989 | European Pat. Off. . |
| 2042579 | 9/1980 | United Kingdom . |

OTHER PUBLICATIONS

Gunstose, Lipids in Foods—Chemistry, Biochemistry & Technology 1983 pp 82, 152–154.
List et al, "Zero trans Margarines . . . " JAOCS vol. 54 1977 pp 408–413.
Bonanome, A. and Grundy, S.M., New Eng. Jour. Med. 318: 1244–1248 (1988).
Bubeck, D.M., et al., Crop Sci. 29: 652–656 (1989).
Kritchevsky, et al., Nut. Rep. Internat. 35: 265–268 (1987).
List, G.R., et al., J. Amer. Oil Chem. Soc. 54: 408–413 (1977).
Lundeen, P.O., et al., Crop Sci 27: 1102–1105 (1987).
Mensink, R.P. and Katan, M.B., New Eng. Jour. Med. 323: 439–445 (1990).
Miller, L.A. and White, P.J., J. Amer. Oil Chem. Soc. 65: 1324–1333 (1988).
White, P.J., and Miller, L.A., J. Amer. Oil Chem. Soc. 65: 1334–1338 (1988).
Yamanaka, S., and Tanaka, T., 136 Methods in Enzymology 405–411 (1987).
Miller 1988 High Temperature Stabilities of Low–Linolenate, High–Stearate and Common Soybean Oil JAOCS 65(8)1324–1327.

*Primary Examiner*—Carolyn Paden
*Attorney, Agent, or Firm*—St. Onge Steward Johnston & Reens LLC

[57] ABSTRACT

Fat products containing high stearic acid soybean oil blended with other processed or unprocessed oils or fats and having a solids content of at least about 4%, preferably at least about 6%, at 8° F. and a solids content of at least about 1% at 92° F. are disclosed. The blend may be a simple mixture of high stearic soybean oil with processed or unprocessed fats, an interesterified blend, or a combination of these. Preferred products contain no hydrogenated fat.

23 Claims, No Drawings

HIGH STEARIC ACID SOYBEAN OIL BLENDS

RELATED U.S. APPLICATION DATA

This is a continuation-in-part of Ser. No. 07/624,056 filed on Dec. 7, 1990 now abandoned, which was a continuation-in-part of 07/410,161 filed Sep. 20, 1989 now abandoned, the disclosures of which are incorporated herein in their entireties. This is also a continuation-in-part of Ser. No. 07/665,629 filed Mar. 6, 1991 now abandoned.

BACKGROUND OF THE INVENTION

This invention relates to the use, in food products, of high stearic soybean blended with other oils or fats.

Most natural fats and oils contain only cis double bonds, but partial hydrogenation results in the formation of trans fatty acid substituents, which have been recently shown to raise low density lipoprotein serum cholesterol levels and to lower high density lipoprotein serum cholesterol levels in adults fed fats having these acids (Mensink, R. P., and Katan, M. B., New Eng. Jour. Med. 323: 439–445 (1990)).

Since many food products contain partially hydrogenated fats (especially products having a structural fat component comprising a plastic fat or hardstock), various research efforts have been directed to the development of edible fats that mimic the physical and organoleptic properties of partially hydrogenated fats but have diminished or zero trans acid contents. For example, interesterified fat products have been prepared using fully hydrogenated hardstocks (U.S. Pat. No. 3,617,308 to Graffelman), including those having no trans isomers (List, G. R., et al., J. Amer. Oil Chem. Soc. 54: 408–413 (1977)). Low trans fat products have also been prepared by fractionating an interesterified mixture of liquid and completely hydrogenated oil (U.S. Pat. No. 4,425,371 to Stratmann, et al.).

Another approach to low trans products makes use of directed interesterification to prepare fats from liquid oil without the aid of hydrogenation. For example, directed interesterification of sunflower and safflower oils at low temperatures in an aprotic solvent (U.S. Pat. No. 3,859,447 to Sreenivasan) or of corn oil with temperature cycling in the absence of solvent (U.S. Pat. No. 4,419,291 to Lathauwer, et al.) has been disclosed. However, using most oils, the technique yields a plastic product having limited functionality.

In addition to the isomerism of the unsaturated substituents of dietary fats, the saturated substituents also appear to modulate plasma cholesterol concentrations. Recent evidence shows that some fats, notably those high in lauric acid (12:0), myristic acid (14:0), or palmitic acid (16:0) apparently increase plasma cholesterol concentrations, while fats high in stearic acid do not (Bonanome, A., and Grundy, S. M., New Eng. Jour. Med. 318: 1244–1248 (1988)).

A number of publications report the preparation of fats enriched with stearic acid. Fats may be fractionated to yield plastic and hardstock fractions having special characteristics, such as palm stearins (U.S. Pat. No. 4,366,181 to Dijkshoorn and Huizinga) or high stearin butterfat (U.S. Pat. No. 4,438,149 to Verhagen and Bodor). Butterfat has been hardened and then fractionated to obtain fractions suitable for use in margarine (see U.S. Pat. No. 4,479,976 to Lansbergen and Kemps and U.S. Pat. No. 4,504,503 to Biernoth and Merk). Natural fat blends that were substantially free of hydrogenated and interesterified fats have also been disclosed for producing margarines (see, for example, U.S. Pat. No. 4,366,181 to Dijkshoorn, et al.).

SUMMARY OF THE INVENTION

An object of the present invention is to provide new edible fats especially suitable for food products. It is another object of the present invention to provide new fats that are oxidation-resistant and low in calories. It is another object of the present invention to provide fats that are free of an hydrogenated component.

These and other objects are achieved by the present invention which describes food products containing high stearic acid soybean oil blended and/or interesterified with other processed or unprocessed oils or fats. The high stearic acid blends of this invention have a solids content of at least about 4%, preferably at least about 6%, at 80° F. and a solids content of at least about 1% at 92° F. Preferred blends contain essentially no hydrogenated fat.

In one embodiment, high stearic soybean oil is blended with another processed or unprocessed oil or fat. In another embodiment, the blend so produced is interesterified. In a third embodiment, an interesterified blend is mixed with high stearic soybean oil or another fat or oil.

DETAILED DESCRIPTION OF THE INVENTION

Soybean varieties with altered fatty acid profiles, including cultivars with increased levels of palmitic or stearic acid, have been developed (Lundeen, P. O., et al., Crop Sci. 27: 1102–1105 (1987); Miller, L. A., and White, P. J., J. Amer. Oil Chem. Soc. 65: 1324–1333 (1988); White, P. J., and Miller, L. A., J. Amer. Oil Chem. Soc. 65: 1334–1338 (1988); and Bubeck, D. M., et al., Crop Sci. 29: 652–656 (1989)). High stearic soybean varieties typically have about 4 to 6 times the stearic acid levels of conventional soybean oil (for example, 132 to 301 g stearic acid per kg oil compared with about 33 to 51 g/kg).

Typical high stearic soybean oils (herein abbreviated HSSO) have a higher melting temperature and greater oxidation stability than conventional soybean oil (herein abbreviated SO). Elliott, et al., disclosed the use of unmodified high stearic soybean oil in a margarine and a low fat spread (Eur. Pat. Ap. Pub. No. 369,519). Kritchevsky, et al., fed rats a HSSO and found they exhibited lower serum lipid levels, lower liver triglycerides, less weight gain, and smaller livers than control rats fed conventional soybean oil or peanut oil (Nut. Rep. Internat. 35: 265–268 (1987)).

This invention employs HSSO blends having a solid fat content at 80° F. of at least about 4%, preferably at least about 6%, and a solid fat content at 92° F. of at least about 1%, in food products. The HSSO blends of this invention can be prepared by mixing HSSO with another processed or unprocessed oil or fat and, optionally, interesterifying. If interesterified, the blend can be mixed with additional high stearic soybean or other oil in an alternate embodiment.

By the term "solids content" is meant the percentage of a fat that exists in crystalline form at a given temperature. Solid fat contents (herein abbreviated S.F.C.) are determined using nuclear magnetic resonance according to A.O.C.S. Method Cd 16–81. Solid fat indices (herein abbreviated S.F.I.) are determined according to dilatometry using A.O.C.S. Method Cd 10-57. Solids percentages are reported at 50° F. (10° C.), 70° F. (21.1° C.), 80° F. (26.7° C.), 92° F. (33.3° C.), and 100° F. (37.8° C.).

Any HSSO is suitable for this invention. By "high stearic" is meant having a stearic acid content at least about 3 times that of conventional SO. Typical strains have a fatty acid content of about 25 to about 40% stearic acid. One such HSSO strain is the A6 strain described by White and Miller, cited above. Some embodiments employ an HSSO that has a high proportion of stearic acid in the sn-3 position of the triglyceride molecules. Strains having a relatively high palmitic acid content, including those having a palmitic acid content equal to or greater than the content of stearic acid, are especially suitable for confectionery, dessert, and bakery products.

In one embodiment of the practice of this invention, HSSO is blended with another fat or oil. Other fats include any heretofore suggested, such as natural liquid oils, e.g., SO, peanut oil, sunflower oil, high oleic sunflower oil, safflower oil, corn oil, olive oil, canola, rice bran oil, mustard seed oil, cottonseed oil, poppyseed oil, rapeseed oil, high erucic rapeseed oil, marine oil, carrot oil, evening primrose oil, borage oil, and meadowfoam oil; fats such as babassu nut oil, palm oil, palm kernel oil, tallow, lard, dairy butter, shea butter, and hydrogenated fats; and fat fractions, crystallized fats, interesterified fats, combinations of these, and the like. When employed in products with hydrogenated fats such as hydrogenated soybean oil, fully hydrogenated fats are preferred. However, preferred blends contain essentially no hydrogenated fats.

Typical formulations employ about 5 to 95% HSSO, preferably at least about 50% HSSO, blended with another oil or fat to achieve at least about 4%, preferably at least about 6%, solids at 80° F. and at least about 1% solids at 92° F. The blend may be interesterified for such time under such conditions that at least about a 4% solids at 80° F., preferably at least about 6% solids at 80° F., and at least about 1% solids at 92° F., are achieved. Some food products, for example, employ an interesterified blend of about 85 to 90% HSSO and about 10 to 15% corn oil, soybean oil, sunflower oil, peanut oil, cottonseed oil, safflower oil, or rice bran oil. Alternatively, an interesterified HSSO blend may be mixed with additional HSSO or another oil to achieve the requisite solids content.

Preferred HSSO blends are interesterified and contain at least about 75% HSSO. A random interesterification process typically employs a chemical catalyst such as sodium methoxide, followed by neutralization and purification. An sample reaction sequence is given in the Examples.

However, HSSO blends especially suitable for certain applications are prepared by a regiospecific interesterification process employing a 1,3-specific lipase. Where, for example, a fat has a substantial amount of SUU triglycerides, where S is stearic acid and U is a mono-, di-, or triunsaturated $C_{18}$ fatty acid, the lipase enriches the fat product with intermediate-melting triglycerides.

Moreover, HSSO varieties containing palmitic acid can contribute solification properties to the fat. Although some varieties contain less, others contain as much as about 8 to 10% palmitic acid. Varieties containing up to about 25 to 30% palmitic acid are desired for certain food products.

Where U is oleic acid (a monounsaturated $C_{18}$ acid herein abbreviated O), for example, melting points of triglycerides composed of stearic and oleic acid are as follows:

| | |
|---|---|
| SOO | 74° F. |
| SOS | 107° F. |
| SSS | 163° F. |

In mixtures of triglycerides, the melting points of these species are considerably lower. Thus, in this series, the SUU species gives rise to solids at refrigerator temperatures, but these melt at slightly higher temperatures. Food products prepared using oils high in SUU melt at temperatures where some solids are required to maintain either functionality or emulsion stability. Temperatures of about 70° to 80° F. are not uncommon either in bakeries or households. Optimal oils for these uses should therefore contain considerably more SUS.

Margarines, spreads and other fat-based foodstuffs such as cheese, fillings, and dips are subject to an additional constraint. Significant quantities of very high melting triglycerides cause the product to have a waxy mouthfeel and poor release of oil soluble flavors.

Random interesterification described above results in the formation of statistical amounts of SSS, SUU, and USU as well as SUS and SSU species. Randomization of only the 1,3-positions using a catalytic amount of a regiospecific lipase leads to statistically significant amounts of SUS and thus a significantly greater amount of intermediate-melting triglycerides while simultaneously minimizing SSS. This lipase-catalyzed process has the additional advantage of preserving the full calorie reduction observed when stearic acid is situated in the 1,3-positions, since little SSU and USU is formed. Stearic acid, tristearin, or other fats containing saturated moieties in the 1,3-position such as palm oil added to the interesterification reaction mixture further increases production of desirable intermediate-melting triglycerides.

Typical lipase-catalyzed interesterifications are carried out in a temperature range of about 65° to about 100° F. A temperature-directed 1,3-specific lipase-catalyzed interesterification (e.g., conducted at temperatures of about 65° to 80° F.) further enhances the formation of SUS triglycerides without a buildup of SSS because SUS is removed from the reaction by precipitation as it is formed.

As used in the specification and claims, a "lipase" is an enzyme which acts on esters of glycerol and fatty acids. By a "1,3-specific lipase" is meant a lipase that, in the course of the natural hydrolysis reaction, selectively catalyzes the release of fatty acids specifically from the outer 1- and 3-positions of glycerides and, in the course of the reverse synthetic reaction, selectively esterifies the outer 1- and 3-positions of glycerol. Examples of enzymes from this group are pancreatic lipase, rice bran lipase, and microbial lipases from *Aspergillus niger, Mucor miehei, Mucor javanicus, Rhizopus delemar, Rhizopus arrhizus, Rhizopus japonicus, Rhizopus niveus, Pseudomonas fluorescens*, and the like. As will be appreciated by those skilled in the art, the enzymes discussed herein may refer to both highly purified preparations and cruder preparations having extraneous enzymes and other contaminants.

Enzyme preparations obtained by isolation and purification can be directly used as lipases, but immobilized lipases obtained by immobilizing the enzyme on a support material offering a large surface area is preferred (see Yamanaka, S., and Tanaka, T., 136 *Methods in Enzymology* 405–411 (1987)). The support material may be inorganic, for example, silica, or organic, for example, ionic exchange resins having a macroreticular structure. The enzyme can be attached to the support material using any means, such as, for example, physically, by adsorbing, precipitating, or trapping the enzyme on the surface; chemically, by applying a coupling compound to bind the enzyme to the surface; or ionically, by charging the enzyme and joining it to an ion exchange resin, or the like.

Suitable supports are, for example, polymeric materials having a total pore volume of at least 50%, preferably at least 90%, comprising voids (with an average diameter of 1 to 150 microns) interconnected by holes. Support materials include macroreticular polyolefins including polyethylene and polypropylene; other homopolymers and copolymers in which the polymeric unit is ethylenic, such as butadiene and isoprene, and including vinyl and vinylidene units (for example, polyvinyl and polyvinylidene); polystyrene; polyurethane; polycarbonate; polyamides; and polyesters. Hydrophobic photo-crosslinked resin gels, ion exchange resins, hydrophobic materials such as iodopropyl spherosil and octyl- or phenylsepharose, polyacrylamide and porous silica beads are especially effective. Natural materials suitable for use as support material for the invention include diatomaceous earth, natural rubber, and gutta-percha. Inorganic porous materials, e.g., glass, titania, and refractory material, are also suitable. Glass or refractory materials may be coated with polymers.

A solvent may be employed in the reactions (but is not desired in many embodiments). The term "solvent" used herein means any material that is liquid at the synthesis reaction temperature and pressure and will dissolve, suspend or hold the reactants in the reaction mixture in an amount effective to expedite contact for the desired esterification to occur. Water-immiscible solvents are preferable. Example solvents include, but are not limited to, diethyl ether, hexane, heptane, or other water-immiscible solvent, or chloroform.

Lipase-prepared interesterified HSSO blends may be purified using any one of several techniques, including distillation, filtration, crystallization, physical refining, alkali refining, bleaching, deodorization, and the like.

HSSO can be fractionated before or after blending with another oil and before or after interesterification using standard fractionation techniques. Interesterified, fractionated blends are especially suitable for some food products.

Uninteresterified and interesterified HSSO blends, and mixtures thereof, prepared in accordance with this invention can be used as is as the fat component in a food product, or incorporated in combination with other fats, into any food composition, or used in conjunction with any edible material. The term "edible material" is broad and includes anything edible, whether or not intended for nutrition, e.g., it can be a texture modifier such as a plasticizer for chewing gum, a component for cosmetics, or other minor functional ingredient such as a carrier or diluent for use in flavorings, pharmaceuticals, and the like.

Other fats include any heretofore suggested, such as natural liquid oils, e.g., pure HSSO, SO, peanut oil, sunflower oil, high oleic sunflower oil, safflower oil, corn oil, olive oil, canola, rice bran oil, babassu nut oil, palm oil, palm kernel oil, mustard seed oil, cottonseed oil, poppyseed oil, rapeseed oil, high erucic rapeseed oil, marine oil, carrot oil, evening primrose oil, borage oil, and meadowfoam oil; fats such as tallow, lard, dairy butter, shea butter, and hydrogenated fats; and fat fractions, crystallized fats, interesterified fats, combinations of these, and the like. Hydrogenated fats are not preferred, but, when employed, are preferably fully hydrogenated.

Where a fat blend containing a higher solids level is needed, HSSO can be blended with another unhydrogenated or hydrogenated oil or fat containing saturated fatty acids such as palm oil, palm kernel oil, tallow, cocoa butter, lard, coconut oil, cottonseed oil, or fractions thereof. The blend is then, preferably, interesterified. Where a higher saturated to saturated or polyunsaturated to saturated ratio is desired, HSSO is blended with safflower oil, sunflower oil, sorghum oil, soybean oil, corn oil, cottonseed oil, rice bran oil, or sesame oil. This blend is also preferably interesterified.

Typical formulations employ about 25% to 100% HSSO blends and 0 to 75% HSSO or other oil. Preferred products have fat components comprising at least about 50% HSSO blend, and some embodiments employ about 75% or higher HSSO blend. As discussed above, one embodiment employs about 85 to 90% HSSO and 10 to 15% of a liquid oil such as soybean oil, corn oil, sunflower oil, peanut oil, cottonseed oil, or safflower oil. An advantage of the invention is that the proportions of oils or fats blended with HSSO, and, optionally, interesterified, yield a variety of useful edible fat products. By way of illustration, HSSO can be mixed with other oils prior to interesterification in amounts effective to yield fat products having the desirable higher temperature solids contents described above.

Broadly speaking, the HSSO blends of this invention can be employed in fat-containing edible emulsions comprising an oil phase and an aqueous phase, including those high in fat, such as margarines and cheeses, and those high in water, such as low fat spreads. The high stearic soybean oil compositions of this invention can be employed as plastic fats or hardstocks in dairy, meat, nut, egg, and other food products having a high natural fat component, and in vegetable, cereal and other products having a low natural fat component. The high stearic soybean oil compositions of this invention can be employed as ingredients for all types of leavened baked products, both yeast raised and chemically leavened, and unleavened baked products, and as coatings or coating ingredients for the same types of products, as well as for snack food products. In addition, the fats of the present invention can be employed to form edible barrier layers, either on the exposed surfaces of foods or as internal barrier layers used to separate various portions of a food product, e.g., as a barrier between a dessert filling and an outer edible shell.

Representative of food products which can contain, in addition to other food ingredients, the HSSO compositions of this invention are: frozen desserts, e.g., frozen novelties, ice cream, sherbet, ices, and milk shakes; salad dressings; mayonnaises and mustards; dairy and non-dairy cheese spreads; margarine, margarine substitutes and blends; flavored dips; flavored bread or biscuit spreads; filled dairy products such as filled cream and filled milk; frying fats and oils; cocoa butter replacements and blends; candy, especially fatty candies such as those containing peanut butter or chocolate; reformed and comminuted meats; meat substitutes and extenders; egg products and substitutes; nut products such as peanut butter; vegetable and fruit products; pet foods; whipped toppings; compound coatings; coffee lighteners, liquid and dried; puddings and pie fillings; frostings and fillings; chewing gum; breakfast cereals; bakery products, e.g., cakes, breads, rolls, pastries, cookies, biscuits, and savory crackers; and mixes or ingredient premixes for any of these. The HSSO compositions of this invention may also be employed in any flavor, nutrient, drug or functional additive delivery system.

Exemplary food products which can be improved by the use of the HSSO compositions of this invention are: emulsion products, such as margarine products (e.g., full-fat, low-fat, and fat substitute products and products having high linoleic acid), dips and spreads having a fat phase and an aqueous phase; shortenings; bakery products, including snack products that have a coating containing fat or oil, and contain a flour or starch component in addition to the fat ingredient; candies and confections which contain a sweetener such as sugar or aspartame in addition to the fat ingredient; and dairy products and substitutes such as cheeses which contain a dairy protein such as whey, casein or caseinate, or the like in addition to the fat ingredient. The margarine products also typically contain a milk component and butter flavor.

For example, SFI values required for an oil phase to be used in a stick margarine are a minimum solids content of about 15% at 50° F., a minimum solids content of about 7% at 70° F., and a maximum solids content of about 4%, preferably less than 5%, at 92° F. Preferably, the maximum solids content at 92° F. will be less than 4%, most preferably about 1½ to 3½%. At this specification, the margarine may be formed and wrapped satisfactorily, maintaining the stick form without substantial oil separation at room temperature and yet remains rapid melting on the tongue at about 98° F. A more preferred SFI profile will show solid contents within the following ranges:

| Temperatures | Solids (%) |
| --- | --- |
| 50° F. | 16 to 31 |
| 70° F. | 11 to 18 |
| 92° F. | 3.5 maximum |

Desirably, the stick margarine should remain firm at ordinary room temperature up to about 80° F., and will therefore most preferably have an SFI value at this temperature within the range of from about 6 to about 10.

The SFI solids values required for an oil phase to be used in formulating a tub margarine are a minimum solids content of about 8% at 50° F., and a minimum solids content of about 3% at 70° F. and a maximum solids content of about 4% at 92° F. Preferably, the SFI profile shows solids contents in the following ranges:

| Temperatures | Solids (%) |
| --- | --- |
| 50° F. | 9 to 15 |
| 70° F. | 5 to 10 |
| 92° F. | 3.5 maximum |

Desirable SFI profile values for the fat phase of whipped topping mixes are in the following ranges:

| Temperatures | Solids (%) |
| --- | --- |
| 50° F. | at least 45 |
| 70° F. | at least 30 |
| 80° F. | 15 to 25 |
| 92° F. | 5 to 20 |
| 100° F. | 0 to 10 |

It is an advantage of this invention that the physical properties of the HSSO fats can be varied over wide ranges by judicious manipulation of the parameters mentioned above. Formulations for chocolate or confectionery applications, for example, can employ fats which, in the food product, yield high-flow-temperature mixtures, salad oils can employ fats yielding medium-flow-temperature mixtures that do not readily crystallize upon refrigeration, margarines and shortenings can employ those that yield from high to low flow temperature mixtures, and bakery products may employ fat mimetics that are stable to oxidation on storage. By "flow temperature" is meant the temperature at which a one centimeter cube of the material, upon heating and supporting a one 0.1 gram weight begins to flow. For purposes of definition, low flow temperatures will be within the range of up to about 40° F., medium flow temperatures are within the range of from about 40° to about 70° F., and high flow temperatures are above about 70° F., but preferably below about 98° F.

As has been discussed, HSSO blends are employed in food products as is or blended before or after interesterification with other oils or fats that are preferably not hydrogenated. Where blended and/or interesterified with other hydrogenated oils or fats, these are preferably fully hydrogenated. Thus, preferred food products formulated using the IHSSO of this invention are essentially trans-acid free, and most preferred products contain essentially no hydrogenated fat.

In some embodiments, HSSO blends are employed in amounts effective to reduce the calories in the food product. By reduction in calories is meant delivering less than the 9 kcal/gram delivered by full calorie fats. In these embodiments, HSSO blends replace all or part, preferably at least about 50%, of the full calorie fat in the fat component.

EXAMPLES

The following examples are presented to further illustrate and explain the present invention and should not be taken as limiting in any regard. Unless otherwise indicated, all parts and percentages are by weight, and are based on the weight at the particular stage of the processing being described.

Example 1

In this example, a refined strain A6 (described by White and Miller cited above) high stearic acid soybean oil (HSSO) sample is compared with conventional soybean oil (SO). Using fatty acid profiles determined using gas liquid chomatography and solid fat indices (S.F.I.) determined dilatometrically using A.O.C.S. Method Cd 10-57, the following results are obtained:

|  |  | HSSO | SO |
| --- | --- | --- | --- |
| Chain Length | C 16:0 | 8.1 | 10.6 |
|  | C 18:0 | 29.6 | 4.0 |
|  | C 18:1 | 24.2 | 23.0 |
|  | C 18:2 | 31.1 | 54.0 |
|  | C 18:3 | 4.3 | 7.0 |
|  | C 20:0 | 2.4 | 0.1 |
| S.F.I. | 50° F. | 22.6 | 0 |
|  | 70° F. | 8.4 | — |
|  | 80° F. | 0 | — |
|  | 92° F. | — | — |
|  | 100° F. | — | — |

Example 2

This example details a process for the random interesterification of a high stearic acid soybean oil blend.

In a reaction vessel fitted with an agitator and heating/cooling coils, a blend of an oil with refined high stearic soybean oil is heated under vacuum to about 110° C. in order to remove any moisture which might inactivate the catalyst. After this drying step, the oil blend is held at 110° C., and about 0.2% sodium methoxide is sucked into the reactor. The mixture is stirred for at least a half hour under vacuum, and a sample is withdrawn for melting point determination. An increase in melting point determined using a Mettler dropping point apparatus confirms that the reaction has taken place. Phosphoric acid is added to neutralize the catalyst. The interesterified oil blend is then washed with water, dried, bleached, and deodorized.

Example 3

A high stearic soybean oil (HSSO) and HSSO blends with soybean oil (HSSO/SO) are randomly interesterified by reacting the oil or blends with 0.2 to 0.3% sodium methoxide for half an hour at 110° C. as described in Example 2 above to yield interesterified blends, which is (in some cases) blended with untreated oil to obtain products having the following solid fat indices:

| SFI | 50° F. | 70° F. | 80° F. | 92° F. | 100° F. | 104° F. |
| --- | --- | --- | --- | --- | --- | --- |
| HSSO | 22.6 | 8.4 | 0 | | | |
| IHSSO[1] | 17.4 | 8.4 | 7.9 | 6.5 | 4.5 | 3.5 |
| I—HSSO/SO, 85/15[2] | 8.6 | 3.3 | 2.7 | 1.7 | 0 | |
| HSSO + IHSSO, 50/50[3] | 13.6 | 2.3 | — | 0.6 | | |
| HSSO + IHSSO + I—HSSO/SO[4] | 11.3 | 2.9 | — | 1.6 | | |

[1]The Mettler Dropping Point is 110.9° F.
[2]The Mettler Dropping Point is 91.6° F.
[3]Physical blend of HSSO and IHSSO.
[4]A mixture of 40% HSSO, 40% of the 85/15 interesterified HSSO/SO blend and and 20% IHSSO.

Example 4

A blend of 90% HSSO and 10% SO is interesterified as described in Example 2 above. The product so obtained is washed, dried, and deodorized.

Example 5

In this example, an interesterified HSSO blend is prepared using an immobilized fungal lipase produced by submerged fer mentation of a selected strain of *Mucor miehei*. The enzyme preparation, Lipozyme™ obtained from Novo Enzymes, employs a macroporous anion exchange resin as a carrier yielding a granular product with a particle size of 0.3–0.6 mm. Lipozyme™ has an activity of approximately 25 BIU/g. A BIU or "batch interesterification unit" is defined as 1 micromole of incorporated palmitic acid into triolein per minute, determined when an equimolar mixture of triolein and palmitic acid are incubated in petroleum ether (12 ml; 56.5 mM of each substrate) with 250 mg (dry weight, ~275 mg Lipozyme) enzyme at 40° C.

65 parts HSSO and 35 parts palm oil are heated to 65° C., and 5 to 10% Lipozyme™ is added with stirring. Small aliquots are withdrawn periodically, and the melting curve examined using differential scanning calorimetry (D.S.C.). When changes in the melting curve, as evidenced by the buildup of intermediate-melting triglycerides, cease to occur, the reaction is judged to be complete.

Example 6
Low Fat Spread
A 40% table spread may be prepared by emulsifying

| | parts |
| --- | --- |
| Oil Phase Ingredients | |
| Example 4 I—HSSO/SO | 39.38 |
| Lecithin | 0.10 |
| Distilled Monoglycerides from Unhydrogenated Sunflower Oil | 0.50 |
| Flavor | 0.010 |
| with | |
| Aqueous Phase Ingredients | |
| Water | 57.86 |
| Gelatin (250 Bloom) | 2.75 |
| Salt | 2.00 |
| Nonhygroscopic Whey | 0.5 |
| Potassium Sorbate | 0.10 | and passing the emulsion through a cooled, scraped-surface heat exchanger in the usual process.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A fat product having a solids content at 80° F. of at least about 4% and a solids content of at least about 1% at 92° F. consisting essentially of an interesterified blend of high stearic soybean oil and another oil or fat.

2. A fat product according to claim 1 wherein said blend comprises at least about 50% high stearic soybean oil.

3. A fat product according to claim 1 wherein said blend has a solids content of at least about 6% at 80° F.

4. A fat product according to claim 3 wherein said blend comprises at least about 75% high stearic soybean oil.

5. A shortening comprising the fat product according to claim 3.

6. A water and oil emulsion which contains the fat product according to claim 3.

7. A fat product according to claim 1 wherein the other oil or fat is selected from the group consisting of corn oil, soybean oil, sunflower oil, peanut oil, cottonseed oil, safflower oil, and rice bran oil.

8. A fat product according to claim 1 wherein the other oil or fat is selected from the group consisting of palm oil, palm kernel oil, tallow, cocoa butter, lard, coconut oil, and cottonseed oil.

9. A fat product according to claim 8 wherein said fat product contains essentially no hydrogenated fat.

10. A fat product according to claim 1 wherein the other oil or fat is soybean oil.

11. A fat product comprising an interesterified blend of at least about 50% high stearic soybean oil and another oil or fat, said blend having a solids content at 80° F. of at least about 6% and a solids content at 92° F. of at least about 1%, and containing essentially no hydrogenated fat.

12. A fat product according to claim 11 comprising at least about 75% high stearic soybean oil.

13. A fat product according to claim 12 wherein said other oil or fat is selected from the group consisting of corn oil, soybean oil, sunflower oil, peanut oil, cottonseed oil, safflower oil, rice bran oil, palm oil, palm kernel oil, tallow, cocoa butter, lard, coconut oil, and cottonseed oil.

14. A fat product according to claim 12 comprising an interesterified blend of about 85 to 90% high stearic soybean oil and about 10 to 15% soybean oil.

15. A fat product according to claim 11 produced by interesterification in the presence of a 1,3-specific lipase.

16. A fat product according to claim 15 wherein said 1,3-specific lipase is attached to a polymer support.

17. A fat product according to claim 16 wherein said interesterification is conducted at temperatures of about 65° to 100° F.

18. A fat product according to claim 17 wherein said interesterification is conducted at temperatures of about 65° to 80° F.

19. A fat product according to claim 16 interesterified in the presence of added stearic acid, tristearin, or palm oil.

20. A fat product according to claim 19 interesterified in the presence of added palm oil.

21. A fat product comprising a blend of at least about 75% high stearic soybean oil and another oil, said blend having been interesterified in the presence of 1,3-specific lipase under conditions effective to achieve a solids content of at least about 6% at 80° F. and at least about 1% at 92° F. and containing essentially no hydrogenated fat.

22. A fat product according to claim 21 comprising a blend interesterified at a temperature of about 65° to about 80° F.

23. A fat product according to claim 21 comprising a blend of high stearic soybean oil and soybean oil.

* * * * *